3,317,599
UREAS AND ALCOHOL PRODUCTS

Edward A. Swakon, Hammond, Ind., assignor to Standard Oil Company, Chicago, Ill., a corporation of Indiana
No Drawing. Filed Apr. 30, 1964, Ser. No. 364,024
7 Claims. (Cl. 260—553)

This invention relates to a method for the simultaneous production of urea and beta-mercapto alcohols or beta-mercapto mercaptan.

It has been found that N,N-disubstituted monothiolcarbamic acids, provided by their salts with secondary or tertiary amines, react with olefin oxides or sulfides to produce S-(beta-hydroxy- or beta-mercapto-alkyl) N,N-disubstituted monothiolcarbamates. Also, the N-monosubstituted monothiolcarbamic acids provided by their amine salt, e.g. primary, secondary or tertiary amine salt, react at low temperatures, i.e. well below 10° C. and in the range of −65 to 10° C., with olefin oxides or sulfides to produce stable S-(beta-hydroxy- or beta-mercapto-alkyl) N-monosubstituted monothiolcarbamates. However, when an olefin oxide or sulfide reacts with monothiolcarbamic acid ammonia salt or the primary amine salt of N-monosubstituted monothiolcarbamic acid at reaction temperatures of from 15 to 90° C., a reaction differing in kind occurs to produce urea or sym. disubstituted urea and a beta-mercapto alcohol or beta-mercapto mercaptan. These two reactions differing in kind can be illustrated by the following reaction equations involving (A) di-n-butyl amine salt of N,N-(di-n-butyl) monothiolcarbamate and ethylene oxide and (B) monothiolcarbamic acid ammonia salt and ethylene oxide:

(A)

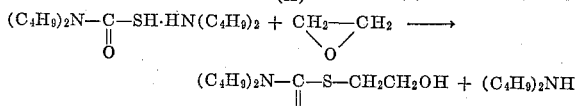

(B)

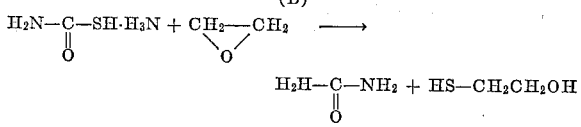

The method of this invention, therefore, comprises reacting at a temperature of from 15 to 90° C. an olefin chalcide with ammonium monothiolcarbamate or a N-monosubstituted monothiolcarbamic acid salt of an amine, each either per se or formed in situ by the reaction of carbonyl sulfide with two moles of ammonia or with two moles of a primary amine. By "olefin chalcide" is meant an olefin oxide or olefin sulfide whose chalcogen atom has an atomic number of from 8 to 16 inclusive and therefore is oxygen and sulfur only.

The olefin chalcide reactant can be represented by the structural formula

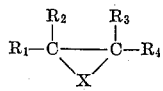

wherein $R_1$, $R_2$, $R_3$ and $R_4$ can be the same or different substituents represented by hydrogen, alkyl hydrocarbon groups, arylhydrocarbon groups, aralkyl hydrocarbon groups, cycloalkyl hydrocarbon groups and X is oxygen or sulfur. Any one of $R_1$, $R_2$, $R_3$ and/or $R_4$ can also be an alkylene oxide or sulfide group as in a dioxide, disulfide, trioxide, trisulfide, etc. Illustrative of the olefin chalcide reactant but not a limitation thereof are ethylene oxide, ethylene sulfide, propylene oxide, propylene sulfide, 1,2-dimethylethylene oxide, 1,2-dimethylethylene sulfide, 1-ethylethylene oxide, 1-ethylethylene sulfide, 1-n-propylethylene oxide, 1-n-propylethylene sulfide, 1-isopropylethylene oxide, 1-isopropylethylene sulfide, 1-methyl-2-ethylethylene oxide, octylene oxide, octylene sulfide, dodecene oxide, dodecene sulfide, cyclohexene oxide, cyclohexene sulfide, limonene monoxide, limonene sulfide, pinene oxide, styrene oxide, styrene sulfide, p-methylstyrene oxide, p-methylstyrene sulfide, p-methyl-α-methylstyrene oxide, p-methyl-α-methylstyrene sulfide, p-isopropylstyrene oxide, 1-naphthalene-ethylene oxide, divinylbenzene dioxide, dicyclopentadiene dioxide, divinylbenzene disulfide, 1,4-hexadiene dioxide, vinylcyclohexene dioxide and 3-vinyl-1,4-pentadiene trioxide.

A convenient way to carry out the method of this invention is to react carbonyl sulfide gas with ammonia or primary amine at ambient pressure and temperature in a suitable solvent such as a lower alkanol for example, methanol, ethanol, isopropanol, propanol or the butyl alcohols which can be readily removed from the reaction products at low temperatures. Since methanol has the lowest boiling point of the lower alkanols, it is preferred. Then the olefin chalcide reactant is added. This method can be conducted without loss of reactants in open reaction vessels even when all gaseous reactants, e.g. carbonyl sulfide, ammonia and ethylene oxide are employed. The urea and the beta-mercapto alcohol or beta-mercapto mercaptan products are conveniently recovered by dissolving the beta-mercapto alcohol or beta-mercapto mercaptan in a solvent which does not dissolve the urea products. Ether dissolves the beta-mercapto alcohol or beta-mercapto mercaptan but not the ureas. Other suitable solvents for the mercapto alcohol or dimercaptan include benzene, toluene, dipropyl ether, among other dialkyl ethers and water. Other techniques for separating the ureas from the mercapto alcohol or dimercaptan can be employed.

Pressures and temperatures above ambient pressures and temperatures can be employed if desired or useful for example when it is desired to provide a melt of the co-product mercapto alcohol or dimercaptan when such products are solids at ambient temperature. Excessive reaction temperatures should be avoided especially when the olefin chalcide and mercapto alcohol or dimercaptan will react readily to form ether alcohols and thio alcohols and thioether dimercaptans, e.g., beta-hydroxyethyl beta-mercaptoethyl ether, di-(betamercaptoethyl) thioether and the like. The reaction with the olefin chalcide is, in general, exothermic so heat need not be added to bring about reaction and reaction at 15 to 90° C. is suitable.

The method of this invention can be more readily understood, practiced and expanded with respect to the use of other olefin chalcides hereinbefore disclosed as well as others that will be suggested thereby, by a few typical illustrative examples.

Example 1

To a 500 milliliter, 3-neck round bottom flask is added 250 grams methanol and 17 grams (1.0 mole) ammonia. Carbonyl sulfide is bubbled into the methanol solution of ammonia until 30 grams (0.5 mole) COS are absorbed. It can be observed that the bubbles of COS are consumed before reaching the surface of the solution. To about one-half, 148 grams, of the COS-methanol-ammonia reaction mixture there is added 12 grams (about 0.27 mole) ethylene oxide slowly while maintaining the reaction below 20° C. as a maximum temperature. After the ethylene oxide had been added, methanol is removed by distillation to a pot temperature of 118° C. To the distillation residue ether is added with agitation and it was observed that a white precipitate formed. The white solids are recovered by filtration, washed with ether and dried.

The ether filtrate is recovered and reserved.

There is recovered 10 grams of white solids. A sample of the white solids is found to melt at 131° C. and appears to be urea which melts at 132° C. A sample of the white solid is mixed with authentic urea and the mixture heated to determine the melting point of the mixture. No depression of melting point of urea is observed. An aqueous solution of the white product is added to a saturated aqueous solution of oxalic acid. The melting point of the solid recovered is identical to urea oxalate. Hence the white solid product is urea.

The recovered and reserved ether filtrate is warmed to remove ether and a residue remained. This residue is distilled into three fractions two of which are condensates taken at the temperatures and pressures indicated and the third fraction is the distillation residue. The distillation conditions and quantity of each fraction obtained is as follows:

TABLE I

| Fraction | Boiling range, ° C. at mm. Hg | Grams |
| --- | --- | --- |
| 1 | 20–24 at 0.05 mm. Hg | 9.8 |
| 2 | 102–110 at 1.0 mm. Hg | 4.78 |
| 3 (residue) | | 1.63 |

Fraction 1 is redistilled into three fractions under the following conditions:

TABLE II

| Fraction | Boiling Range at mm. Hg | Grams | Refractive Index $n_D^{20}$ |
| --- | --- | --- | --- |
| 1-1 | 111° C. at 170 mm. Hg | 0.9 | |
| 1-2 | 111° C. at 172 mm. Hg | 5.7 | 1.4792 |
| 1-3 | 111° C. at 174 mm. Hg | 2.2 | 1.4991 |

Elemental analysis of fraction 1–2 agrees with expected beta-mercaptoethanol as the following indicates:

Found: C, 30.74%; H, 8.12%; S, 38.73%. Calculated: C, 30.75%; H, 8.10%; S, 41.00%.

Both infra-red spectrum and gas chromatography analysis (Hercoflex 700 Celite column) of fraction 1–2 are in excellent agreement with authentic beta-mercapto ethanol.

Infra-red spectrum of fraction 2 is similar to that of fraction 1–2 and beta-mercaptoethanol, but, because of the higher boiling point of fraction 2, it is beta-hydroxyethyl beta-mercaptoethyl ether:

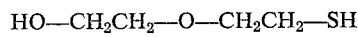

$$HO-CH_2CH_2-O-CH_2CH_2-SH$$

Fraction 1–1 is found by gas chromatography analysis to contain mainly methyl Cellusolve and a small amount of ethanol amine.

*Example 2*

There is charged to a 500 milliliter, 3-neck round bottom flask 250 grams methanol and 17 grams of ammonia. Thereafter carbonyl sulfide is bubbled into the solution until 30 grams are taken up. To one-half of the resulting solution (0.25 mole of ammonium monothiol-carbamate) there is slowly added 15 grams (slight excess of 0.25 mole) of propylene oxide while maintaining a reaction temperature of 15 to 20° C. Methanol is removed by distillation and, when ether is added to the residue, a white solid remains undissolved. The white solid is recovered by filtration and the ether filtrate is reserved. The white solid is urea.

The filtrate is distilled first at atmospheric pressure to remove ether and then at reduced pressure to obtain 2-mercapto isopropanol (3-mercapto-2-propanol).

*Example 3*

To the one-half of the methanol solution of (0.25 mole) ammonium monothiolcarbamate prepared but not used in Example 1 there is slowly added 15 grams ethylene sulfide while maintaining a reaction temperature of about 20–25° C. The methanol is removed by distillation leaving a residue. Addition of ether to this residue leaves a white solid. The white solid, urea, is recovered by filtration. The filtrate is distilled to remove ether and then further distilled at reduced pressure to recover 1,2-dimercapto ethane.

*Example 4*

To the one-half of the methanol solution of (0.25 mole) ammonium monothiolcarbamate prepared but not used in Example 2 there is slowly added 30 grams of styrene oxide while maintaining a reaction temperature of about 25–30° C. Methanol is distilled from the resulting reaction mixture. The remaining residue is stirred with ether leaving a white solid which can be recovered by filtration, decantation, centrifugation and the like means for separating a solid from a liquid. The white solid is urea. The ether solution is distilled to remove ether. The residue contains mainly 2-phenyl-2-mercapto ethanol.

*Example 5*

In the apparatus of Example 1 there is added 18.5 grams n-butylamine, 100 grams of triethylamine and 16 grams of carbonyl sulfide. The temperature of the mixture reaches 50° C. after all the carbonyl sulfide is added and separates into two liquid layers. The top layer is water-white and the bottom layer is yellow. This two layer mixture is cooled to 32° C. and thereafter 15 grams propylene oxide is slowly added over a period of five minutes during which time the temperature of the reaction mixture increases to 71° C. The resulting reaction mixture is homogeneous and pale yellow. Triethylamine is stripped leaving a residue of about 48 grams.

The 48 gram residue is distilled at reduced pressure taking the following fractions at the indicated reduced pressures and temperatures:

|  | grams |
| --- | --- |
| Fraction 1 (24–35° C. at 1.0 mm. Hg) | 6.34 |
| Fraction 2 (52–56° C. at 1.8 mm. Hg) | 12.78 |
| Fraction 3 (105–119° C. at 1.2 mm. Hg) | 4.50 |
| Bottoms fraction | 16.3 |

Fraction 1 is identified as triethylamine, Fraction 2 is identified as 2-mercaptopropanol and the bottoms fraction is identified as sym. dibutyl urea.

Example 5 illustrates that the method of this invention is applicable also to the production of sym. disubstituted ureas through the reaction of an olefin chalcide with a N-monosubstituted monothiolcarbamic acid amine salt.

Suitable primary amines include but are not limited to methyl amine, ethyl amine, n-propyl amine, isopropylamine, n-butylamine, t-butylamine, the amyl amines, the hexyl amines, the hexyl amines, the heptyl amines, the octylamines, and higher N-alkyl hydrocarbon primary amines; cyclopentylamine, cyclohexylamine and other alicyclic primary amines, aniline, toluidine, 1-naphthyl amine and other aromatic primary amines; benzyl amine, phenethylamine, furfurylamine, furanamine, 2-p-dioxanamine and the like.

What is claimed is:

1. A method for simultaneously producing a mercaptan selected from the class consisting of beta-hydroxy and beta-mercapto mercaptans and a symmetrical urea selected from the class consisting of urea and sym. N,N'-disubstituted urea, which method comprises reacting at a temperature of from 15 to 90° C. an olefine chalcide with a monothiolcarbamate selected from the class consisting of ammonium monothiolcarbamate and N-monosubstituted monothiolcarbamate amine salts.

2. A method for simultaneously producing a sym. disubstituted urea and an alcohol having a beta-mercapto group which method comprises reacting at a temperature of from 15 to 90° C. an amine N-monosubstituted monothiolcarbamate with an olefin chalcide.

3. A method for simultaneously producing a beta-mercapto alcohol and urea which method comprises reacting at a temperature of from 15 to 90° C. an olefin oxide with ammonium monothiolcarbamate.

4. A method for simultaneously producing a beta-mercapto mercaptan and urea which comprises reacting at a temperature of from 15 to 90° C. an olefin sulfide with ammonium monothiolcarbamate.

5. A method for simultaneously producing urea and beta-mercapto ethanol which comprises reacting at 20° C. ethylene oxide with ammonium monothiolcarbamate.

6. A method for simultaneously producing urea and beta-mercapto ethylmercaptan which comprises reacting at a temperature of 20 to 25° C. ethylene sulfide with ammonium monothiolcarbamate.

7. A method for simultaneously producing N,N'-dibutyl urea and 3-mercapto-2-propanol which comprises reacting at 71° C. propylene oxide with N-n-butylmonothiolcarbamic acid salt of triethyl amine.

No references cited.

ALEX MAZEL, *Primary Examiner.*

H. R. JILES, *Examiner.*